Nov. 1, 1966 A. J. BANKS 3,283,259

PULSE DISTRIBUTION AMPLIFIER

Filed Jan. 23, 1963 2 Sheets-Sheet 1

INVENTOR.
ARTHUR J. BANKS
BY
W. H. Sponagle
Attorney

Nov. 1, 1966 A. J. BANKS 3,283,259

PULSE DISTRIBUTION AMPLIFIER

Filed Jan. 23, 1963 2 Sheets-Sheet 2

INVENTOR.
ARTHUR J. BANKS
BY
W. H. Sprouagle
ATTORNEY

United States Patent Office 3,283,259
Patented Nov. 1, 1966

3,283,259
PULSE DISTRIBUTION AMPLIFIER

Arthur J. Banks, Cherry Hill, N.J., assignor to Radio Corporation of America, a corporation of Delaware
Filed Jan. 23, 1963, Ser. No. 253,423
4 Claims. (Cl. 330—24)

Figures 1, 2, 3:
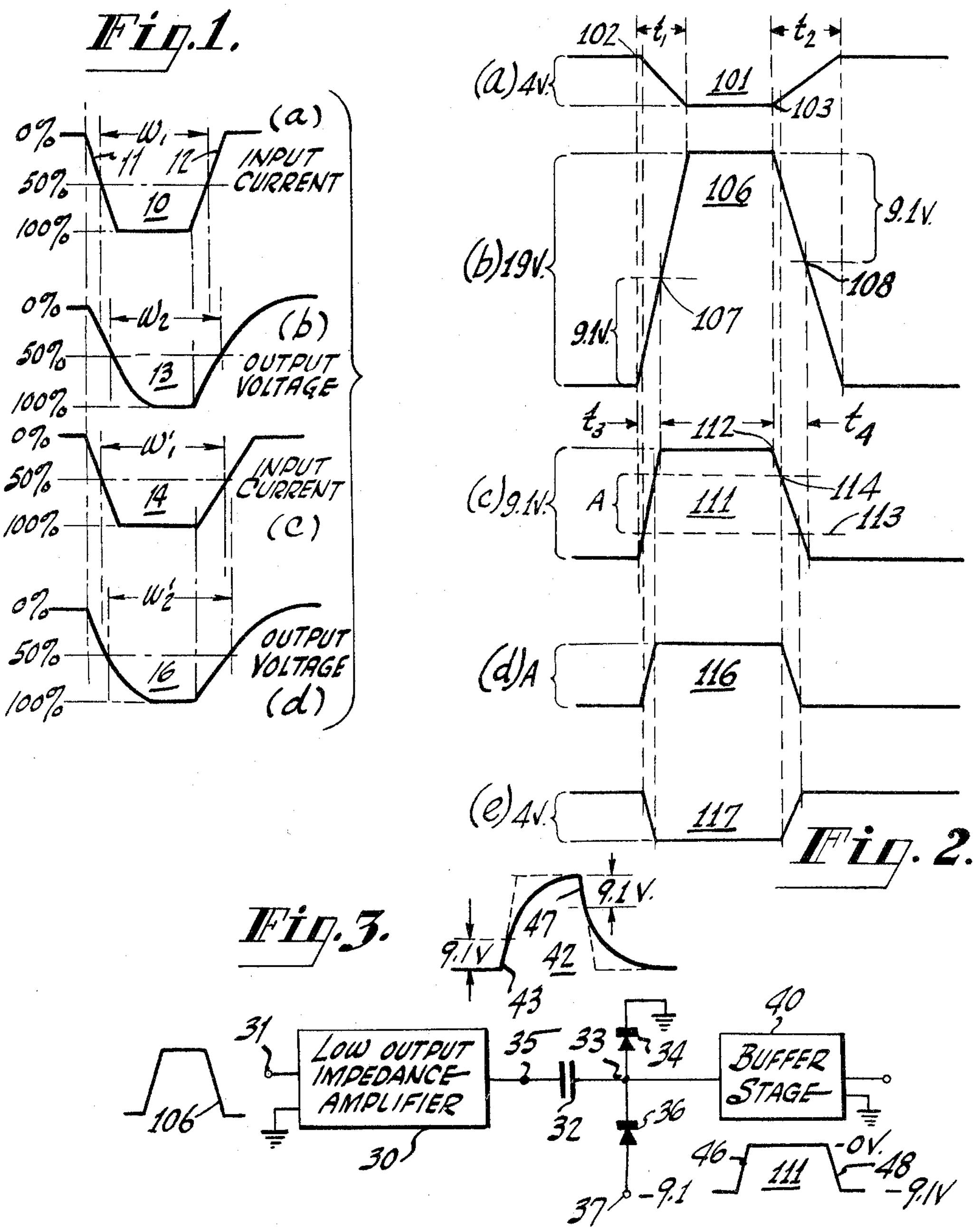

The present invention relates to a pulse re-forming method and apparatus. More particularly, the present invention relates to a pulse distribution amplifier for producing one or more output pulses substantially similar to each applied input pulse.

In many installations using electronic circuitry, such as in television broadcast stations, it is desirable to provide several similar pulse signals for operation of auxiliary equipment. The pulse signals to be distributed to the auxiliary circuits may have already been degraded so that it becomes desirable to re-form the signals and to produce output signals substantially equivalent to the originally generated signal.

The signals utilized are generally trapezoidal in form. When these signals pass through active or even passive transmission systems the shape of the pulse is generally distorted or degraded. In order to re-form pulse signals substantially similar to the originally generated signals it is often desirable to steepen the leading and trailing edges of the pulse and to remove any overshoots, ringing or noise signals that may be present.

One of the difficulties of re-forming pulses is the determination of which portion of the pulse signal is to be utilized. There are several different portions of the pulse to select to produce accurately an output pulse having a pulse width which is the substantially equivalent of the originally generated input pulse. As will be discussed subsequently in the specification, improvements may be made over the conventional methods of pulse width selection.

Accordingly, it is an object of the present invention to provide a pulse re-forming method and apparatus which faithfully reproduces the originally generated pulse.

A second object of the present invention is to provide a pulse distribution amplifier which produces one or more output pulses having a desired shape in relation to each input pulse.

Another object of the present invention is to provide a method and apparatus for producing output pulses in accordance with the amplitude of selected portions of the leading and trailing edges of the input pulse.

With the above objects in mind the present invention mainly consists of apparatus for re-forming an input pulse having a leading and trailing edge. First impedance means are included responsive to the respective leading corners of the leading and trailing edges of the input pulse for respectively initiating corresponding leading and trailing edges of an output pulse. Second impedance means connected in circuit with the first impedance means are included for terminating the leading edge of the output pulse after a time period less than the rise time of the input pulse. Third impedance means are included which are connected in circuit with the first impedance means for terminating the trailing edge of the output pulse after a time period less than the fall time of the input pulse.

Figure 4:
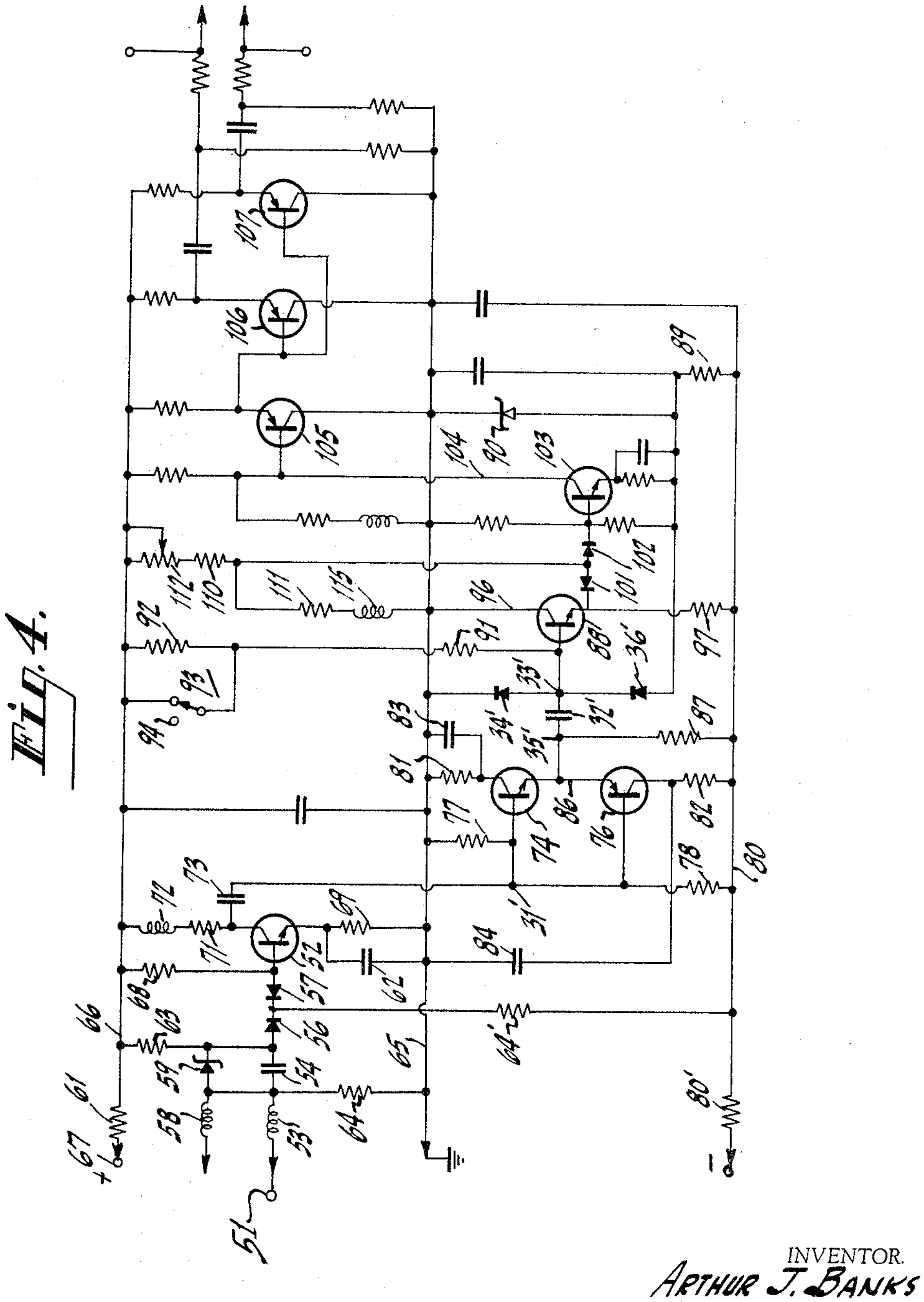

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1, including SUB-FIGURES 1(*a*)–1(*d*), is a graphical representation of the effects of an RC network on pulse waveforms;

FIGURE 2, including SUB-FIGURES 2(*a*) and 2(*b*), is a graphical representation of the waveforms generated by apparatus incorporating the principles of the present invention;

FIGURE 3 is a diagrammatic representation, partially in block and schematic form, indicating the principles of operation of circuitry producing the waveform of FIGURE 2(*b*) from the input waveform of FIGURE 2(*a*); and FIGURE 4 is a schematic diagram of a pulse distribution amplifier constructed in accordance with the principles of the present invention.

Referring to the drawings, and more particularly to FIGURE 1, the general problems of pulse re-formation will be discussed. In FIGURE 1(*a*) is illustrated a symmetrical trapezoidal pulse represented by the waveform 10 having a leading edge portion 11 and a trailing edge portion 12. The most common way of defining the width of the pulse 10 is the time, $W_1$, between the 50% amplitude level of the leading and trailing edges. The pulse width may also be defined at the level 10% of the way from the base of the pulse to its top or possibly at the 90% level.

FIGURE 1(*a*), for example, could depict a current pulse applied to a load resistor having shunt capacity.

FIGURE 1(*b*) indicates the resulting output voltage produced by such application of the input current of FIGURE 1(*a*). The waveform 13 of FIGURE 1(*b*) has a pulse width, $W_2$, equal to the pulse width, $W_1$, each being taken at the 50% level. However, if the pulse width were defined at the 10% level, the pulse width of waveform 13 would be larger than the pulse width of waveform 10. If the pulse width were defined at the 90% level, the pulse width of the waveform 13 would be smaller than the pulse width of the waveform 10.

It should further be noted that the 50%-level pulse width is unchanged by this RC network only if the input pulse has equal leading- and trailing-edge rise times. This can be demonstrated by referring to FIGURE 1(*c*), illustrating a waveform 14 having a pulse width defined at the 50% level as $W_1'$. The leading edge of waveform 14 is substantially steeper than the trailing edge thereof.

In FIGURE 1(*d*) the waveform 16 illustrates the output voltage resulting from the application of waveform 14 to an RC network. The pulse width, $W_2'$, of waveform 16 is smaller than the pulse width, $W_1'$, of waveform 14. This results from the fact that the RC time constant has a greater effect on the steeper leading edge than on the less steep trailing edge.

Thus it has been demonstrated that even a passive system, represented by the RC network in the foregoing discussion, can change the pulse width which is defined at the 50% level, due to the inequality of the respective rise- and fall-times of the leading and trailing edges of the input pulse.

Further difficulties are presented in defining the pulse width as the width between the 50% level of the leading and trailing edges. If it is desired to re-form a pulse in a pulse distribution amplifier, it is possible that its input pulse width—defined at the 50% level—has already been altered by a passive transmission system. To re-form such a pulse, in a manner preserving its 50% width, one method of proceeding would be to take a small region at the 50% level of the pulse and amplify it. From such a procedure a time delay would be introduced which would be a function of the leading-edge rise time of the input signal.

From the above discussion it is apparent that conventional methods of defining pulse width may be improved upon. Either the resulting output pulse is larger or smaller than the input pulse, or a time delay proportional to the rise time of the leading edge is introduced, or both. To overcome these difficulties it is proposed to define the width of a pulse as the time between the leading corners of the leading and trailing edges of the pulse.

Referring now to FIGURE 2, various waveforms are shown to illustrate the manner in which apparatus incorporating the principles of the present invention reforms input pulses to produce corresponding output pulses in accordance with the above proposed pulse width definition. In FIGURE 2(*a*), waveform 101 illustrates the input pulse to be reformed. For illustrative purposes, this pulse is assumed to have an amplitude of four volts. The leading corner of the leading edge of pulse 101 is indicated at 102 and the leading corner of the trailing edge is indicated at 103. The rise time of pulse 101 is indicated as $t_1$ and the fall time as $t_2$.

The proposed definition of pulse width utilizes the time between the leading corners 102 and 103 and produces a re-formed pulse having substantially the same time period between the leading corners of its leading and trailing edges. This is accomplished by successively producing the waveforms shown in the remainder of FIGURE 2.

In FIGURE 2(*b*), waveform 106 is produced by amplifying and inverting waveform 101. The amplitude of waveform 106 is 19 volts for our illustrative case. It should be noted that waveform 106 has the same rise and fall times $t_1$, and $t_2$, respectively, as waveform 101. Also, the time period between the leading corners of the leading and trailing edges of waveform 106 is the same as for waveform 101. Since the amplitude of waveform 106 is substantially greater than waveform 101, the leading and trailing edges of waveform 106 are steeper than the respective edges of waveform 101.

In accordance with the principles of the present invention, the waveform 106 is used to produce the waveform 111 shown in FIGURE 2(*c*). The waveform 111 has a rise time, $t_3$, which is shorter than the rise time, $t_1$, of waveforms 101 and 106 and has a fall time, $t_4$, which is shorter than the fall time, $t_2$, of these waveforms. The leading edge of waveform 111 is formed to have a leading corner corresponding to the leading corner of the leading edge of waveform 106. The leading edge of waveform 111 is terminated after a time period, $t_3$, which is shorter than the rise time $t_1$. This corresponds in waveform 106 to the point 107 on the leading edge thereof. For the illustrated case the amplitude at point 107 equals 9.1 volts.

The trailing edge of waveform 111 has a leading corner 112 which corresponds in time to the leading corner of waveforms 101 and 106. The trailing edge of waveform 111 is terminated after a time period, $t_4$, which is shorter than the fall time $t_2$. This corresponds to the point 108 on the trailing edge of waveform 106 and for the illustrative example, point 108 is 9.1 volts less than the leading corner of the trailing edge of waveform 106.

Thus, in waveform 111 of FIGURE 2(*c*), a pulse is produced which has a time period between the leading corners of its leading and trailing edges which corresponds to the time period between the leading corners of the leading and trailing edges of the original pulse 101. Accordingly, this pulse re-forming operation preserves the timing relationship between the leading corners of the transitions of the input pulse just as in a passive transmission system. However, while a passive transmission system degrades—or increases—rise- and fall-times, the pulse re-forming operation shown in FIGURES 2(*a*), (*b*) and (*c*) decreases the rise and fall times.

This operation is consistent with a primary function of a pulse distribution amplifier, namely decreasing rise- and fall-time because they are lengthened in transmission lines in cascade with the pulse distribution amplifier. The result of such pulse re-forming operation is an output pulse having a minimum delay, which delay is substantially independent of the rise time of the leading edge of the input pulse.

The waveforms of FIGURES 2(*d*) and 2(*e*) are included to indicate the actual output pulses produced in the apparatus to be subsequently explained with respect to FIGURE 4. The waveform shown in FIGURE 2(*a*) is actually an idealized waveform. In practice it has been found that ringing effects may be present in waveform 101 due to its passage through the various auxiliary electronic circuits. Also, the leading corners of the leading and trailing edges of waveform 101 are not always clearly defined because of the degradation of the input pulse 101 which may have taken place in the auxiliary circuits. Therefore, only a portion of waveform 111 is actually used.

In FIGURE 2(*c*) line 113 represents 1.9 volts which is 10% of the amplitude of waveform 106. Also, line 114 represents 1.9 volts down from the maximum amplitude of the waveform 111. As will be subsequently explained the portion of waveform 111 below line 113 and the portion of waveform 111 above line 114 are clipped to produce the waveform 116 of FIGURE 2(*d*). The waveform 116 is then reduced and inverted to produce output waveform 117 of FIGURE 2(*e*). The amplification factor is chosen so that waveform 117 has an amplitude of four volts which is equivalent to the amplitude of waveform 101 of FIGURE 2(*a*). It should be noted that the leading corner of waveform 117 occurs at a point equivalent to 10% of the leading edge of waveform 101. Also, the leading corner of the trailing edge of waveform 117 occurs at a time equivalent to a point on the trailing edge of waveform 101 which is 10% down from its maximum amplitude.

Referring now to FIGURE 3, a diagrammatic representation of apparatus for producing waveform 111 from waveform 106 is illustrated. In FIGURE 3, a low output-impedance amplifier 30 is provided, in this instance having a unity gain. The amplifier 30 has an input terminal 31 and an output terminal 35. Connected to the output terminal 35 is one side of a capacitor 32, the other side of which is connected to a junction point 33. Connected to the junction 33 is the anode of a diode 34 the cathode of which is connected to a point of reference potential such as ground. Also, connected to the junction point 33 is the cathode of a second diode 36 the anode of which is connected to a point of negative potential 37. For purposes of the illustrated example, the negative potential point is chosen as −9.1 volts. Finally, connected to the junction point 33 is the input of a buffer stage 40.

Further, for purposes of illustration, it is assumed that the input pulse 101 to be re-formed is a negative pulse which is approximately 4 volts peak-to-peak, and the corresponding negative output pulses should be capable of being varied between approximately 3.85 volts and 4.15 volts peak-to-peak. Also the diodes 34 and 36 are presumed to be ideal so that the forward voltage drop would be considered zero.

In operation, the 4-volt input pulse 101 is amplified and inverted at an input stage (not illustrated in FIG. 3), producing an input pulse having the waveform identified in FIGURES 2(*b*) and 3 by the numeral 106. As pointed out hereinabove pulse 106 has an amplitude of substantially 19 volts. At the time of the beginning of the input pulse it is assumed that the capacitor 32 is in a state of equilibrium and has no charging current flowing. Also, the voltage at the junction point 33 is assumed to be −9.1 volts at the start. The amplifier 30 to which the input pulse 106 is applied has a unity gain and accordingly will pass the pulse 106 substantially unchanged, except for the loading effects hereinafter described.

The output pulse from the amplifier 30 is represented in FIGURE 3 by the waveform 42. The dotted line portion of waveform 42 represents the output pulse which would be obtained from the unity gain amplifier 30 but for the operation of the circuitry connected to the output terminal 35 thereof. The solid line of the waveform 42 represents the actual output pulse obtained at the output terminal 35. The first 9.1 volts of the leading edge of the output waveform 42 is represented by the numeral 43. The pulse appearing at the junction point 33 is illustrated in FIGURES 2(*c*) and 3 by the waveform 111.

Because the diodes 34 and 36 are back-biased and therefore represent high impedances, the first 9.1 volts represented by the portion 43 of the waveform 42 is transferred to the input of the buffer stage 40. This is the leading edge portion 46 of waveform 111. However, when the junction point 33 reaches ground potential, the diode 34 conducts, heavily loading the amplifier 30. The capacitor 32 charges through the low output impedance of amplifier 30 and the forward impedance of the diode 34. The time constant for this charging period is made small enough so that the capacitor 32 is charged to equilibrium during the duration of the waveform 106, as shown by the waveform 42. Therefore, just before the negative transition of the pulse 106, no current will be flowing through the capacitor 32 or the diode 34.

The circuit is therefore ready for the negative transition and will not have to "sweep out" the stored charge of the diode 34, with resulting time delay. For the first 9.1 volts of the negative transition, diodes 34 and 36 are again back-biased so that this portion of the transition is transferred through the capacitor 32 to the input of the buffer stage 40 without change. This 9.1 voltage portion of the waveform 42 is represented by the numeral 47. In the output pulse 111 this is the trailing edge portion 48.

When the potential at the junction point 33 reaches —9.1 volts, the diode 36 conducts to discharge the capacitor 32 through the low output impedance of the amplifier 30 and the forward resistance of the diode 36. The time constant for this discharge is substantially the same as that for charging the capacitor 32 during the positive transitional period. When the capacitor 32 has been discharged to a point of equilibrium and when no current is flowing through this capacitor or the diode 36, the circuit is ready for the positive transition of the next input pulse.

It is thus seen that the diagrammatic circuit representation of FIGURE 3 will produce an output pulse which will recover the timing relation between the leading corners of the positive and negative transitions of the input pulse. This will be accomplished with a minimum time delay to the first corner of the pulse. One advantage of this technique lies in the fact that a pulse can be transmitted through cascaded circuits such as that shown in FIGURE 3 and through portions of a passive transmission system without losing the original relationship between the leading corners of the transitions. This relationship will be maintained even if changes are made in the system which may affect rise time. For example, the delay through the overall system would not be changed by the substitution of equal lengths of cable having different high frequency attenuation characteristics into the system. Such differing attenuation characteristics affect only the rise time and not the delay.

The input impedance of the buffer stage 40 as well as the back resistances of the diodes 34 and 36 are actually finite. Therefore, the voltage at the junction point 33 will not remain constant indefinitely as illustrated by the waveform 111 but rather will climb toward some hypothetical voltage which is the effective voltage to which the net value of these resistances are returned. Thus the magnitude of the time constant of the capacitance of the capacitor 32 multiplied by this "leakage" resistance represents the limit of the time duration of the positive and negative pulses which the circuit will handle.

As pointed out hereinabove, it is also desirable to clip both the top and bottom of the pulse 111 produced at the junction 33. The top and bottom portions are not as flat as indicated by the idealized waveform 111. During the production of the pulse, the conducting diode passes from a state of heavy current conduction to a state of no conduction. Therefore the anode of the diode may be several tenths of a volt positive with respect to its cathode during heavy conduction, this voltage difference being gradually reduced towards zero as less and less current flows. This will distort the idealized waveform. For these reasons, as well as those given above, a pair of diode clippers may be added to the output of buffer stage 40 as shown in FIGURE 4.

Referring now to FIGURE 4, a complete circuit for producing the results diagrammatically illustrated in FIGURE 3 is shown as utilized in a pulse distribution amplifier. The negative pulses 101 to be re-formed are applied to input terminal 51 and from there to the base electrode of an input amplifier transistor 52 by means of an inductor 53, a capacitor 54 and diodes 56 and 57. Also provided at the input circuit to the amplifier are an inductor 58, a zener diode 59 and resistors 63, 64, 64', and 68. The lower end of resistor 64 is connected to a conductor 65 which in turn is connected to a point of reference potential such as ground potential.

The upper ends of resistors 63 and 68 are connected to conductor 66 which has a positive potential applied thereto at terminal 67 through decoupling resistor 61. Such positive potential on conductor 66 may be 36 volts for the illustrative example. The lower end of resistor 64' is connected to conductor 80, which is connected to a source of negative potential through decoupling resistor 80'. For the illustrative example the negative potential source provides a voltage of —36 volts at conductor 80.

The inductors 53 and 58, together with the amplifier input capacity-to-ground, form a T-section, constant-K filter providing an image impedance, for example, of 75 ohms. The inductors 53 annd 58 therefore serve to compensate for the input capacity of the amplifier shown in FIGURE 4. This arrangement also permits a pulse to be taken from inductor 58, which will be the same as the input pulse, for use in other circuitry, if desired.

The diodes 56 and 57 and their associated resistors 63, 68, and 64' form an input protective circuit for the pulse distribution amplifier. The zener diode 59, which is connected across the capacitor 54, provides protection for this capacitor.

The base electrode of the transistor 52 is connected to the biasing network consisting of resistors 63, 68 and 64', and diodes 56 and 57. The emitter electrode of transistor 52 is connected to resistor 69, the other end of which is connected to ground potential. Connected across resistor 69 is a peaking capacitor 62. The collector electrode of transistor 52 is connected to the positive conductor 66 by means of a resistor 71 and shunt peaking inductor 72.

The transistor 52 amplifies and inverts the input pulse applied to the terminal 51 and produces at the collector electrode thereof a positive pulse having the nominal amplitude of 19 volts for an input pulse of 4 volts. This pulse is substantially equivalent to the pulse 106 of FIGURES 2(*b*) and 3 and is applied through the coupling capacitor 73 to a terminal 31' corresponding to the terminal 31 of FIGURE 3.

Connected to the terminal 31' are the base electrodes of transistors 74 and 76. Transistor 74 is an NPN transistor and transistor 76 is a PNP transistor. The base electrodes of the transistors 74 and 76 are connected to the junction point of a voltage divider made up of resistors 77 and 78 which in turn are connected in series between the ground conductor 65 and the negative conductor 80.

The collector electrode of the transistor 74 is connected to the ground conductor 65 by means of a resistor 81, and the collector electrode of the transistor 76 is connected to the negative voltage conductor 80 by means of a resistor 82. Also connected respectively between the collector electrodes of transistors 74 and 76 and ground potential are the bypass capacitors 83 and 84.

The emitter electrodes of the two transistors are directly connected to each other by means of a conductor 86 and to an output terminal 35' which corresponds to terminal 35 of FIGURE 3. The emitter electrodes are also connected to the negative conductor 80 by means of a resistor 87.

The output terminal 35' is connected to one end of a capacitor 32', the other end of which is connected to junction point 33' between a diode 34', a diode 36' and the base electrode of a transistor 88. These components identified by the primed numerals correspond to the components having the same but unprimed numerals in FIGURE 3.

The cathode of the diode 34' is connected directly to the ground conductor 65 while the anode of the diode 36' is connected to the junction point between a resistor 89 and a zener diode 90. The potential of the anode of the diode 36' is established at approximately —9.1 volts by the resistor 89 and zener diode 90 which are connected in series between the ground conductor 65 and the negative conductor 80. The base electrode of the transistor 88 is connected to the positive conductor 66 by means of resistors 91 and 92. The resistor 92 is shown shorted out by a switch 93 capable of being operated into an open position when connected to its unconnected terminal 94.

The collector electrode of the transistor 88 is directly connected to ground conductor 65 by means of a conductor 96, while the emitter electrode thereof is connected to the negative conductor 80 by a resistor 97.

In operation the circuit thus far described in FIGURE 4 is substantially similar to that diagrammatically represented in FIGURE 3.

The input pulse 101 which is applied to the input terminal 51 and which is to be re-formed is amplified and inverted in the transistor 52 as indicated above. This positive pulse, substantially equivalent to pulse 106 of FIGURES 2(*b*) and 3, is applied from the collector electrode of transistor 52 by means of the coupling capacitor 73 to the terminal 31'. The transistors 74 and 76 form a complementary symmetry amplifier having unity gain and no inversion. They have a low output impedance and thus provide a low impedance drive for the capacitor 32'.

Accordingly, the positive pulse 41 applied to the base electrodes of transistors 74 and 76 tends to produce at the terminal 35' the dotted waveform of pulse 42 of FIGURE 3. For the first 9.1 volts of waveform 42, the diodes 34' and 36' offer high impedance and the positive voltage is applied to the base electrode of the transistor 88, representing the buffer stage 40 of FIGURE 3. This positive portion corresponds in FIGURE 3 to the leading edge 46 of waveform 111. When the zero voltage level is reached, the diode 34' becomes forward biased, permitting the capacitor 32' to be charged through the forward resistance of this diode and the output impedance of transistor 74. The potential at terminal 33' thus remains substantially at ground potential, as indicated by the flat portion of waveform 111 of FIGURE 3.

As described above with respect to FIGURE 3, the capacitor 32' will be fully charged before the pulse appearing at terminal 35' begins its negative transition. When this negative transition is initiated, it will be transferred to the base electrode of the transistor 88 for the first 9.1 volts thereof. This is represented by the trailing edge 48 of the waveform 111 of FIGURE 3. Beyond this 9.1-volt portion of the trailing edge, the diode 36' will become forward biased, permitting the capacitor 32' to discharge through the forward resistance of this diode and the low impedance path provided by the transistor 76. The potential at terminal 33' will therefore remain substantially at —9.1 volts.

Thus the waveforms 42 and 111 of FIGURE 3 are produced respectively at terminals 35' and 33' of the circuit of FIGURE 4. The transistor 88, corresponding to the buffer stage, accordingly has applied to its base electrode the waveform 111, which has a pulse width defined by the negative and positive transitions of the input pulse to be re-formed.

The emitter electrode of the transistor 88 is connected by means of clipper diodes 101 and 102 to the base electrode of an amplifier transistor 103. The collector electrode of transistor 103 is directly connected by conductor 104 to the base electrode of an emitter-follower transistor 105.

The emitter of transistor 105 is directly connected to the base electrodes of output transistors 106 and 107. Respective outputs from transistors 106 and 107 are taken from their respective emitter electrodes. Thus several re-formed output pulses are available for use as required.

The diodes 101 and 102 connected to the emitter of the transistor 88 provide the final clipping operation performed on the idealized output waveform 111. The diode 101 does the final positive clipping, while the diode 102 does the final negative clipping. The junction between diodes 101 and 102 is connected to the voltage divider formed by potentiometer 112, resistors 110 and 111, and inductor 115, which are connected in series between positive conductor 66 and ground. The potentiometer 112 controls the positive clipping level so as to provide the proper output pulse level variation of approximately $\pm 4\%$ required by the illustrative pulse distribution amplifier example.

For the 9.1 volts amplitude of the illustrative example, the diodes 101 and 102 are biased to pass only a selected central portion of the waveform 111, shown in FIGURE 2(*c*) as that portion between lines 113 and 114. Therefore, the first 1.9 volts and last 1.9 volts of both the leading and trailing edges of pulse 111 are clipped, thus providing only the central portion of pulse 111, having the amplitude, A, as shown in FIGURE 2(*d*). This eliminates any ringing effects or slanted portions that may be present in the waveform 111 for the reasons given hereinabove. It also provides an output pulse 116, each leading corner of which begins at a time corresponding to the time at which the respective transition at the input crosses the level 10% of the way from the leading corner. The 10% figure is established from the fact that the 1.9 volts being clipped from each end of the signal at this point is 10% of the 19-volt pulse being applied at the point 31'.

The clipped waveform is applied to the base electrode of the transistor 103, which functions both as an inverter and an amplifier having a gain of approximately 1.75. This restores the amplitude of the clipped output pulse to its desired level as shown in waveform 117 of FIGURE 2(*e*).

The output transistors 106 and 107 are identical emitter-follower output stages, each capable of driving a 75-ohm transmission line with a source impedance of approximately 75 ohms.

The complementary symmetry amplifier made up of transistors 74 and 76 utilizes the two transistors in order to provide the advantages in this circuit of a high amplitude bi-directional charging current for the capacitor 32'. A positive current for the positive transition and a negative current for the negative transition are desired. If a simple emitter-follower transistor such as transistor 74 alone is used, it could supply the high positive current necessary to charge the capacitor 32' but it would tend to cut off for the negative transition unless the transistor were run at a very high quiescent current. The transistor 76 provides the means of supplying the negative current required for discharging capacitor 32' during the negative transition.

As indicated above, the pulse distribution amplifier making up the illustrative example is utilized for providing output pulses to operate different broadcast station equipment. It is therefore capable of operation for various width pulses. The longest duration negative pulse applied to this amplifier would be the pulse used for vertical blanking in a television signal. This negative pulse produces a positive pulse at point 33'. For a long duration positive pulse at this point, the base current of the transistor 88 may cause this base to go negative. The resistor 91 is connected to the positive conductor 66 to provide a source for this base current.

Enough of this base current is provided to prevent the tilt on vertical blanking at this point from passing the clipping level of the subsequent diode clipper. If the resistor 91, which may be 560,000 ohms, for example, is left in the circuit when a vertical drive signal is present, the current flowing therethrough during the relatively long interval between vertical drive pulses, when the base current of transistor 88 is relatively small, will make the voltage at junction 33' rise excessively, whereas ideally it should remain constant at −9.1 volts.

Therefore, when the pulse distribution amplifier is utilized for re-forming vertical drive pulses, the additional resistance 92 is connected in series with resistor 91 by operating the switch 93 to the open terminal 94. The resistor 92 may be in the order of 5.1 megohms, for example, decreasing the base current supply to a minimum.

It should be appreciated that a certain time delay accompanies the overall operation of the apparatus of FIGURE 4. However, this time delay is substantially the same for the leading corners of both transitions and therefore does not appreciably affect the timing relationship between these corners. The delay is incurred primarily in the amplifier stages of transistor 52 and transistor 103.

Also, the gain of amplifier 30 in FIGURE 3 and of the complementary symmetry amplifier FIGURE 4 is chosen to be unity only as a matter of convenience. The gain of this amplifier may be greater than unity, in which case the amplitude of the leading edge of the output pulse from the amplifier 30 would be larger than the total amplitude of the leading edge of the input pulse to the amplifier. The important factor is the rise time of this output pulse. Therefore, the leading corner of the leading edge of the output pulse from the amplifier 30 would correspond to the leading corner of the leading edge of the input pulse to the amplifier. The leading edge of the output pulse would, however, be terminated after a time interval which is less than the rise time of the input pulse. Also, the leading corner of the trailing edge portion of the output pulse from amplifier 30 would correspond to the leading corner of the trailing edge of the input pulse. The trailing edge of the output pulse would be terminated after a time period less than the fall time of the input pulse.

It is therefore seen that the amplifier 30 of FIGURE 3 and the complementary symmetry amplifier of FIGURE 4 initiate leading and trailing edges which "correspond" respectively to the leading and trailing edges of the input pulse applied thereto. The term "correspond" as so used indicates that the leading corner of the leading edge of the output pulse occurs at the same time as the leading corner of the leading edge of the input pulse and the leading corner of the trailing edge of the output pulse occurs at the same time as the leading corner of the trailing edge of the input pulse. Therefore the time period between the leading corners of the transitions of the input pulse is equal to the time period between the leading corners of the transitions of the output pulse.

While the principles of the present invention have been illustrated for utilization in a pulse distribution amplifier, it should be appreciated that the method of pulse re-forming set forth herein need not be limited solely to such equipment. There are many situations in the use of electronic circuitry when it is desired to re-form input pulses wherein the produced output pulses are required to have a preselected relationship with respect to the input pulses. The method and apparatus set forth herein provide a way of re-forming pulses to have a very close relationship to the input pulses.

What is claimed is:

1. In apparatus for re-forming pulses in response to input pulses each having a leading edge and a trailing edge, the combination comprising:

amplifier means having a relatively low impedance output circuit and being responsive to the respective leading corners of the leading and trailing edges of said input pulses for initiating in its output circuit corresponding leading and trailing edges of output pulses having a given peak voltage value;

utilization means having a relatively high impedance input circuit for re-formed pulses;

means including a capacitor coupling the output circuit of said amplifier means to the input circuit of said utilization means;

a charging circuit for said capacitor including a first diode, one electrode of which is connected at a point between said capacitor and said utilization circuit and having a given time constant which is no longer than the time duration of one of said pulses so as to charge said capacitor to equilibrium;

a discharging circuit for said capacitor including a second diode, one electrode of which is connected at said point between said capacitor and said utilization circuit and having a time constant substantially equal to said given time constant so as to discharge said capacitor to equilibrium; and means for impressing upon said first and second diodes biasing voltages of a value less than said given peak pulse voltage value, whereby voltage values of the leading and trailing edges of said output pulses up to but not exceeding said biasing voltage value are transferred by said capacitor to said utilization circuit and voltage values of said leading and trailing edges of said output pulses greater than said biasing voltage value respectively render said first and second diodes conducting to alternately charge and discharge said capacitors.

2. In apparatus for re-forming pulses as defined in claim 1 wherein:

said biasing voltage value is not more than one-half of said peak voltage value.

3. In apparatus for re-forming pulses as defined in claim 2 wherein:

said first and second diodes are connected in series with one another in the same polarity with their junction point connected to said point between said capacitor and said utilization means; and said biasing voltage is impressed across said series-connected diodes.

4. In apparatus for re-forming pulses as defined in claim 3 wherein:

said utilization means includes means effectively coupled to the junction point between said diodes for removing from said re-formed pulses the maximum and minimum amplitude portions thereof.

References Cited by the Examiner

UNITED STATES PATENTS

| | | | |
|---|---|---|---|
| 2,731,571 | 1/1956 | Chance ____________ | 307—88.5 |
| 2,927,223 | 3/1960 | Meirowitz _________ | 307—88.5 |
| 3,022,469 | 2/1962 | Bahrs et al. | |

FOREIGN PATENTS

| | | |
|---|---|---|
| 813,676 | 5/1959 | Great Britain. |
| 887,518 | 1/1962 | Great Britain. |

ROY LAKE, *Primary Examiner.*

N. KAUFMAN, *Assistant Examiner.*